Patented Apr. 14, 1931

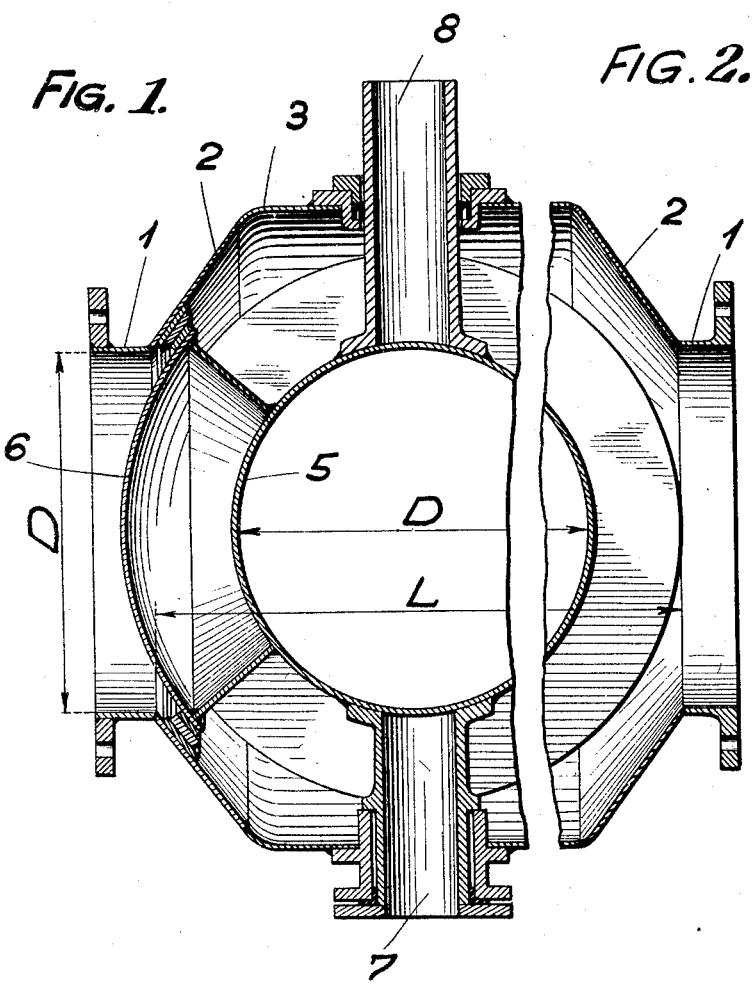

1,800,908

UNITED STATES PATENT OFFICE

JOHANN SCHNYDER, OF KRIENS-LUCERNE, SWITZERLAND

ROTARY GATE FOR PIPE LINES

Application filed September 4, 1928, Serial No. 303,791, and in Switzerland September 29, 1927.

In engineering it is generally known to make parts, which have been formerly made of cast iron, of sheet metal in order to reduce the weight, whereby at the same time all the disadvantages are overcome which are inherent to a cast iron part, viz, porosity, cracks etc. which are often only discovered during the machining and sometimes only during the pressure test and which require in most cases the cast iron part to be replaced.

Rotary valves for pipe lines have been made heretofore exclusively with spherical casings and are therefore also known by the name of spherical valves. The spherical shape of the casing, however, requires the latter to be made of a cast material, for instance of cast iron, cast steel or bronze.

According to the present invention the casing is made of sheet metal parts which are bounded by surfaces which can be easily made of sheet-iron or steel plate and which are connected together by circular seam welding except where a disconnecting of the parts is required.

In this manner not only the above mentioned advantages are obtained which are the consequence of the use of a different material but the range of utilizing these rotary valves is considerably enlarged. With the large pipe diameters and the higher pressures necessitated by the tendency of increasing the size of the turbine units the limit is soon reached beyond which valve constructions with spherical casings are not permissible. This limit is not only dependent on the static pressure against which the valve has to close but it is considerably lowered by the particular working stresses to which these valves are subjected. Generally valves of this type are arranged at the lower end of the pressure pipe lines of water power installations in the immediate neighbourhood of the turbines. When the regulable passage areas of the turbines, i. e. the guide apparatus of Francis-turbines or the needle nozzles of Pelton wheels, are quickly closed, water shocks occur which sometimes stress the valve casing very much. Cast material resists such sudden shocks to a much smaller degree than steel plate. The work incident to rolling a deformation of rolled steel plate is sixteen times greater than that of cast iron and exceeds that of cast steel. Although the excess above the latter is not considerable a construction made as a steel casting has always internal stresses which can only be removed by annealing. In most cases their is no annealing furnace available for a rotary valve for a large pipe diameter; the presence of interior stresses is sometimes only seen by the action of the water shocks. The present invention thus permits by the selection of the material as well as of the shape of the individual parts and their manner of connection the production of rotary valves which are considerably cheaper than rotary valves made of a cast material and which can be built in cases in which constructions in cast materials are out of the question; the invention permits thus obtaining a considerable progress in the special line of constructing rotary valves.

Constructional examples of the subject matter of the present invention are illustrated on the accompanying drawings, in which:

Fig. 1 shows a rotary valve in a vertical longitudinal section and

Fig. 2 is a vertical longitudinal sectional view through a modified construction of casing.

Figure 3:
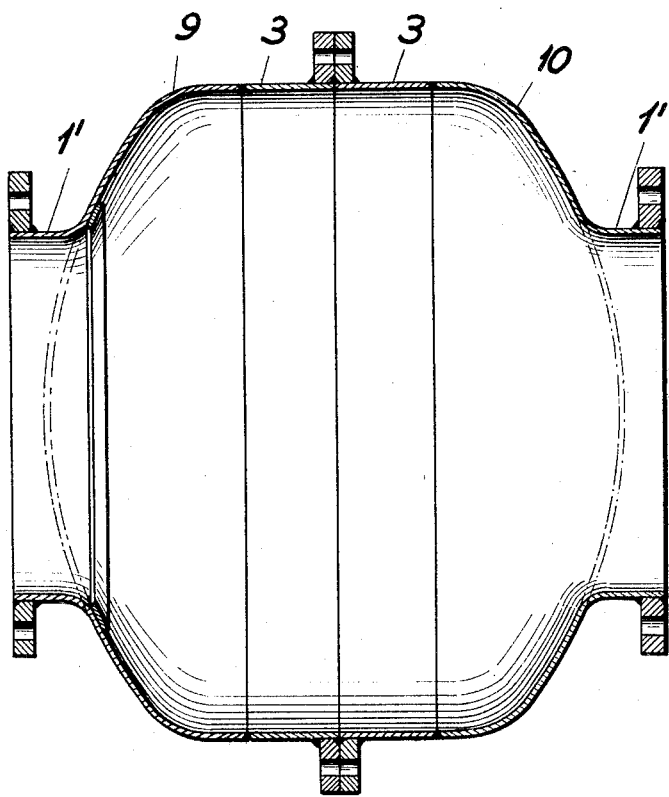
Figure 3 is a vertical longitudinal sectional view through a further modified form of casing.

The casing of the valve shown in Fig. 1, which is of a polygonal axial section comprises a cylindrical main part 3, two convex surfaces of a cone 2 and two cylindrical parts 1. These elements are welded together, preferably by the electric welding method. In Fig. 2 the circular welding seams are arranged in the corners of the polygonal section, while in Figure 1 the welding seams are at a certain distance from these corners. The latter construction is better from a mechanical point of view as the welding seams are not subjected to bending stresses. It is, however, more expensive as the plates have to be flanged. Instead of butt welding the elements the seams may also be obtained by lap welding in a known manner.

A further constructional example of the casing is illustrated in Fig. 3 in which the two halves of the casing consist of boiler heads 9 and 10 having outward flanges 1' and the two cylindrical elements 3.

The rotary gate which consists of the cylindrical tubular part 5 of the inside diameter D and the length L, of the disk 6 and the two pintles 7 and 8, may be made of sheet iron in a similar manner as the casing. The welding of the elements is also effected in a manner similar to that applied for the casing. As the gate is of a more complicated shape than the casing and is of smaller dimensions only the gates for pipes of large diameters will advantageously be made of sheet metal. For certain working pressures and diameters it may be preferable to construct the casing only of sheet metal and the gate body of cast iron or cast steel, in other cases the whole rotary valve may be made of sheet metal.

I claim:

1. In a rotary valve for large diameter, heavy duty pipe lines, a sheet metal casing consisting of juxtaposed annular elements of sheet metal, weld-connected at their adjacent edges and of reduced diameter at the opposite edges.

2. In a rotary valve for large diameter, heavy duty pipe lines; a sheet metal casing consisting of a sheet metal annular middle portion, a substantially conical sheet metal ring adjacent each end of the middle portion and weld-connected thereto.

3. A rotary valve for large diameter heavy duty pipe lines, comprising a casing having a middle, cylindrical and tubular portion, sheet metal conical end portions weld-connected thereto a sheet metal tube within the casing, a sheet metal closure weld-connected to the tube and sheet metal pins at diametrically opposite points on the tube passing through said middle portion and having a weld-connection with the tube.

4. In a rotary valve for large diameter, heavy duty pipe lines, a casing having a middle cylindrical and tubular portion, sheet metal annular, conical portions having weld connection with the ends of the middle portion, and smaller cylindrical, tubular portions having a weld connection with the smaller ends of the conical portions for connection in a pipe line.

5. In a rotary valve for large diameter, heavy duty pipe lines; a casing having a middle cylindrical and tubular portion, sheet metal annular, conical portions having weld connection with the ends of the middle portion, smaller cylindrical, tubular portions having a weld connection with the smaller ends of the conical portions, and connecting flanges weld-connected to the smaller tubular portions for connection in a pipe line.

6. In a rotary valve for large diameter, heavy duty pipe lines; a casing having a middle, cylindrical tubular portion; sheet metal annular conical portions; weld-connections between the larger ends of the conical portion and the ends of the middle portion, and tubular portions having weld connections with the smaller ends of the conical portions, whereby all the connections are in parallel planes; a sheet metal valve disc within said casing, a sheet metal tube in the casing, and a sheet metal cone connecting the disc and sheet metal tube, and sheet metal tubular trunnion pins welded at one end to the sheet metal tube and whose other ends pass through the middle tubular portion of the casing, and bearings for said pins welded to said middle portion.

In testimony whereof I have signed my name to this specification.

JOHANN SCHNYDER.